United States Patent [19]

Doebel

[11] 4,241,726
[45] Dec. 30, 1980

[54] CONCAVE HELIX SOLAR CONCENTRATOR

[76] Inventor: David H. Doebel, 17745 Fruitport Rd., Spring Lake, Mich. 49456

[21] Appl. No.: 934,833

[22] Filed: Aug. 18, 1978

[51] Int. Cl.³ .............................. F24J 3/02; G02B 5/10
[52] U.S. Cl. .................................... 126/438; 350/293; 350/303
[58] Field of Search ............... 126/438, 439, 417, 432, 126/450, 416, 424, 425; 350/288, 289, 293, 303

[56] References Cited

U.S. PATENT DOCUMENTS

| | | | |
|---|---|---|---|
| 1,162,505 | 11/1915 | Nichols | 126/438 X |
| 1,814,897 | 7/1931 | Coxe | 126/438 |
| 4,077,392 | 3/1978 | Garner | 126/438 X |
| 4,129,119 | 12/1978 | Yoke | 126/438 X |
| 4,135,493 | 1/1978 | Kennedy | 126/438 X |
| 4,144,594 | 9/1978 | Meyer | 350/288 X |

FOREIGN PATENT DOCUMENTS 2626842  10/1977  Fed. Rep. of Germany ........... 126/438

Primary Examiner—James C. Yeung
Assistant Examiner—Larry Jones

[57] ABSTRACT

A device is provided for efficiently collecting and concentrating the sun's radiant energy, which comprises a semi-tubular concave helix reflector with up to a 360 degree turn or turns in its length, to concentrate the sun's rays on a central collecting core continuously as the sun moves through its solar day without the use of opto-electro-mechanical tracking devices.

The central collecting core is disposed within the focal point of the concave helix reflector and a heat exchange medium is piped through the collecting core. The energy transferred to the heat exchange medium may be utilized in a useful manner. Elevation of the device is easily adjustable to seasonal sun elevation position.

6 Claims, 7 Drawing Figures

CONCAVE HELIX SOLAR CONCENTRATOR

BACKGROUND OF THE INVENTION

This invention relates to parabolic solar concentrators and more particularly to the method of tracking same with the sun's rays as the sun moves through its solar day or trajectory ascribed more properly to the earth's rotation. Various types of amalgamations of collectors and concentrators have been patented, but generally fall into the basic catagories of collectors or concentrators. For the purposes of background we shall deal only with these basic types of solar collectors and solar concentrators.

The typical solar collector, as differing from a concentrator, may take various forms but often consists of what is called a flat plate collector with a number of methods of running a liquid, more often water, over the flat plate device attempting to transfer as much of the solar heat energy as is thermodynamically feasible into the liquid. The transfer liquid may be circulated within tubes or troughs taking a variety of configurations. These collectors typically do not provide the thermal efficiency of a solar concentrator in order to achieve the same BTU (British Thermal Unit) output that a solar concentrator developes. Such flat plate collectors require considerably more units and a much larger area space wise is consumed in order to accommodate the collector installation mounting. However, the advantage of the flat plate collectors lies within the fact that they essentially can be mounted relatively close to the mounting surface with relatively small protuberance above the mounting surface as compared to the solar concentrator. Furthermore, the flat plate collector does have the advantage of being passive in its ability to track the sun's trajectory on a solar day. That is, typically, the flat plate collector more often does not require complicated active opto-electro-mechanical tracking systems in order to focus the sun's rays onto its collecting surface.

Whereas the solar concentrator requires fewer units or less area installation space to achieve the equivelent thermal output efficiency as compared to a flat plate collector. Concentrators, however, generally necessitate some form of usually expensive tracking devices which often are opto-electro-mechanical in nature and hence may be subject to breakdowns as the nature of such devices often are. It is therefore stated that prior art devices in the realm of solar concentrators, because they focus the sun's rays on a narrow point or band in order to achieve higher thermal efficiency, have proven to be unsatisfactory from the standpoint that they require expensive and complicated tracking devices.

Prior art devices in the form of flat plate collectors lack the high thermal efficiency that concentrators do, but have the advantage of non-complicated non-moving automatic tracking of the sun. However, the tracking they do have is often arrived at with a compromise solar angle attempting to achieve the greatest efficiency during the mid-part of the day.

It is therefore an object of this invention to provide a non-active tracking concentrator that has the advantages of the passive tracking that a flat plate collector provides.

It is a further object of this invention to improve the concentrating capacity of a passive collector at all positions of the sun from sun up to sun down.

A further object of this invention is to provide an easily mounted concentrator capable of being retrofited to almost any normally used solar mounting surface such as a roof.

Another object of this invention is to provide a novel, easily manufactured concentrator structure which is efficient in use but also is low in initial cost and requires little or no maintenance.

SUMMARY OF THE INVENTION

The present invention provides a passive solar concentrator which lacks active tracking means and which automatically focuses the sun's rays on a narrow band or spot to achieve high thermal efficiency.

The present invention permits a device which is relatively inexpensive in that it is easy to make and to maintain. More specifically the present invention provides a semi-tubular concave reflector which has as much as a 360 degree turn to form a helix so as to always expose at least some part of the reflective surface to the sun in order to focus the sun's rays on a central heat transfer core as the sun traverses through an arc across the sky which is predetermined by the season of the year.

It is the principle object of this invention to provide a novel concentrator that eliminates the use of active opto-electro-mechanical tracking devices to move the concave reflector in order to follow the sun.

These and other objects of the present invention will become more apparent in greater detail from the following drawings wherein:

The invention, together with further objects, arrangements, novel features, combinations of parts and embodiments will be easily understood by those skilled in the art after review of the following detailed description as may be shown and described in connection with the device herein disclosed by way of example. Those illustrated embodiments should be considered to be mere examples of structure utilizing the novel principles of the device.

DESCRIPTION OF THE PREFERRED EMBODIMENTS

Figure 1:
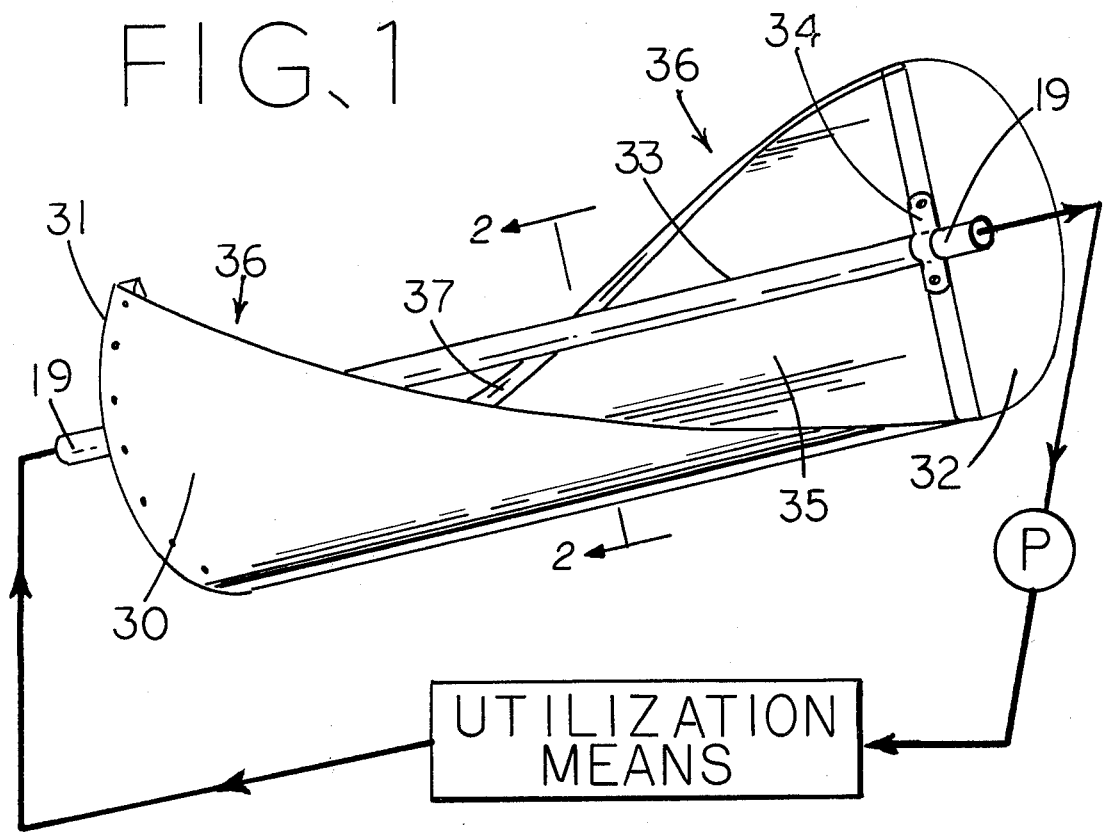
FIG. 1 is a perspective illustration as seen from the left side of the solar concentrator formed so as to utilize the concepts of the present invention.
Figure 2:
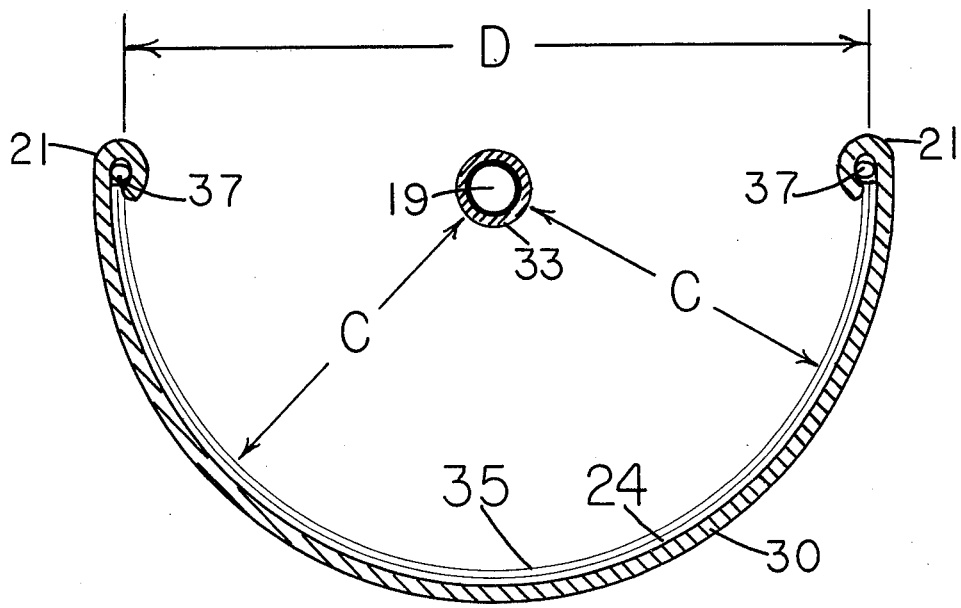
FIG. 2 is a cross section of the concentrator shown in FIG. 1 diagramming the concave form of the reflective surfaces which compose the concave helix concentrator.
Figure 3:
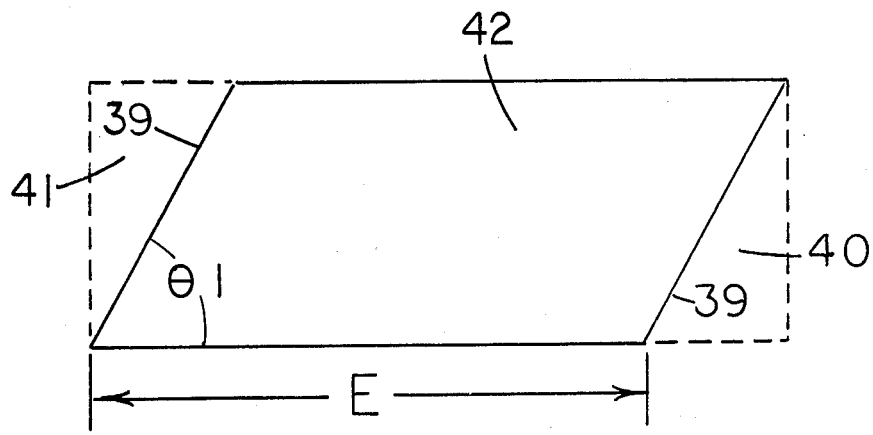
FIG. 3 schematically illustrates one form of a pattern used to fabricate the concave helix reflector body.

Referring to the drawings and particularly FIG. 1 it will be seen that the solar concentrator comprises a concave helix reflector shell 30 and reflector 35 whose purpose is to concentrate or focus the sun's rays entering the open side of the body 36 onto a central heat collecting core 33. The reflector is removably attached by fasteners and is supported by two half circles 31 and 32 composed of particle board, wood, plastic or other suitable laminated waterproofed material, at each end respectively. The half circles 31 and 32 have their diameters opposedly oriented up to 180 degrees from each other. A central heat transfer core 33 or pipe passing between the two half circle 31 and 32 end pieces held by fasteners and retainer clamp strap 34, collects the heat energy of the focused sun's rays. The central core 33 being hollow, will allow the passage of a heat transfer gas or liquid which is circulated by pump P through a utilization means, or 33 may be a photovoltaic cell. Further it should be noted that the central core 33 should be coated flat black so as to absorb more heat energy and to increase efficiency. A stiffening means 37 of steel, brass or aluminum or other means is incorporated in the edges of the concave helix reflector shell 30 and further provides an attachment means for the reflector shell 30 and further provides an attachment means for the reflector itself 35. The coating of the reflector 35 should be highly polished or composed of a highly reflective surface such as "Mylar" metalized film or "Tedlar" polyvinylfluoride film which can be bonded to a waterproofed paper board back that is easily replaced to increase efficiency and help retard atmospheric degradation. Also, a further protective clear top layer of plastic (not shown) can be bonded to the metalized film which has one overlay of "Mylar" or "Tedlar". Referring to FIG. 2 there is shown a transverse cross section taken at mid-point showing the concave form of the reflector which has been hatched to show one method of construction using a light aluminum backing 30 with an inwardly rolled or loosely crimped edge 21. Disposed within the edge 21 is a rod 37 of steel or other suitable stiffening material running the full length of both outer edges of the reflector body 21. The concave reflector 35 having a common focal point 19 which is equidistant C from the sidewall 35 at all points therewith. The metalized film which has a weather resistant overlay, can be bonded to a waterproofed paperboard backing 24 in order to provide a radiant energy insulation layer between it and the aluminum reflector shell 30 in order to prevent some heat loss in the aluminum reflector shell 30 itself. Also by using this form of fabrication the metalized reflector surface 35 along with its backing 24 and overlay can be easily removed and replaced in case of damage or degradation due to atmospheric conditions simply by loosening the crimped edge 21 and sliding the film 35 and backing 24 out the end section. Due to the concave shape of the reflector, the film 35 and backing 24 are securely held by only the lightly crimped or rolled edges 21. Again referring to FIG. 1 and FIG. 2 in rolling the aluminum shell 30 and by attaching it firmly to the end pieces 31 and 32 respectively with screws, bolts, rivets or other fastening means which in turn are firmly attached by a removable clamp strap 34 to the central core 33 the concave structure of the helix causes the entire reflector body with the edge stiffeners 37 to assume a semi-rigid self supporting posture that will resist the rigors of high winds without the addition of other rigidifying structural members. Disposed at the common focal point 19 is a central heat transfer core 33 as described under FIG. 1 description. The edges of sides 21 form an entrance arpeture D allowing the reflector to receive solar energy from the sun's rays. FIG. 3 illustrates one method of forming the basic pattern for the light aluminum reflector body using a quadrilateral parallelogram wherein angle $\theta$ 1 is chosen to be at least 90 degrees providing a flat parallel end 39 when said aluminum shell is rolled in a concave helix form consistant with the invention as shown in FIG. 1. The angle $\theta$ 1 is chosen to provide the required amount of arpeture opening when the reflector is twisted to facilitate passive tracking of the sun for solar energy from the sun's rays impinging within a given acceptance angle upon the entrance arpeture. It is found that the optimum solar energy from the sun's rays will occur at mid-day due to the angle of solar concentration being least impeded by atmospheric refraction. It is also found that the optimum solar energy collection will occur at the largest acceptance angle available to the collector core. A rectangular section of aluminum or other sheet material, the metalized reflector film with its overlay, and the waterproofed paper board backing are chosen with the dimension E representing the total chosen length of the concentrator. Two triangles 40 and 41 are cut off producing the quadralateral parallelogram 42 which is then twisted to form the helix shape consistant with the invention.

Figure 4:
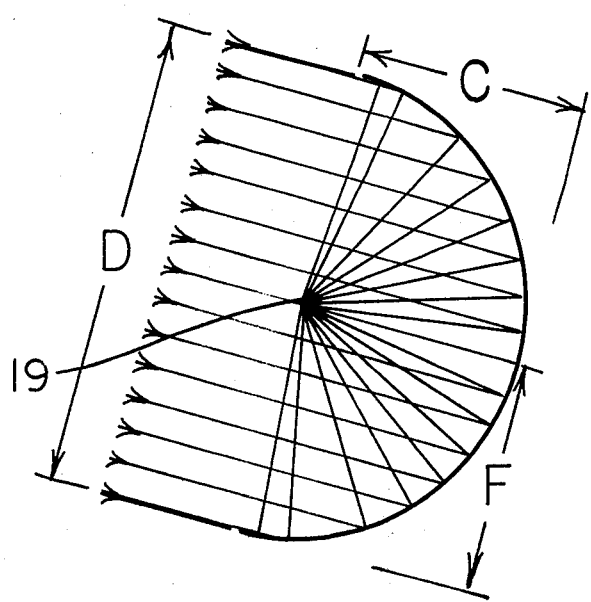
FIGS. 4 and 5 are schematic views indicating the incidence of solar rays at sun up and near sundown respectively as taken from either end of the device.
Figure 5:
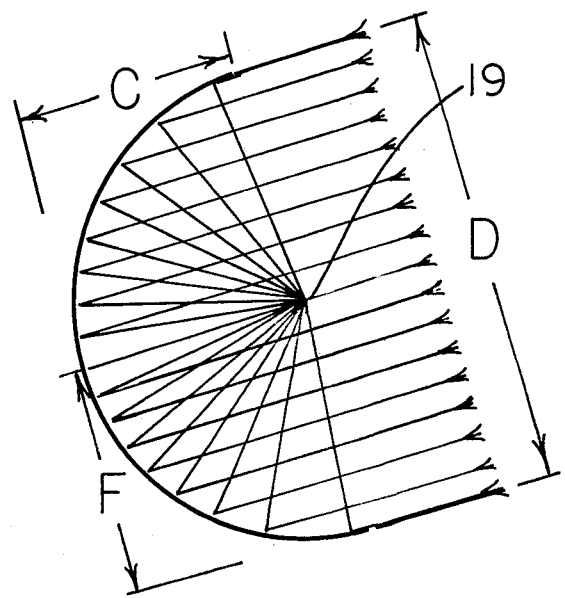

FIG. 4 and FIG. 5 illustrate the acceptance angle that occurs at early optimum morning (FIG. 4) and late afternoon (FIG. 5) respectively. The solar energy of the sun's rays will be focused at a point 19 which is equidistant C from the midpoint of the reflector, concave in form, and equals that of the radian F in dimension.

Figure 6:
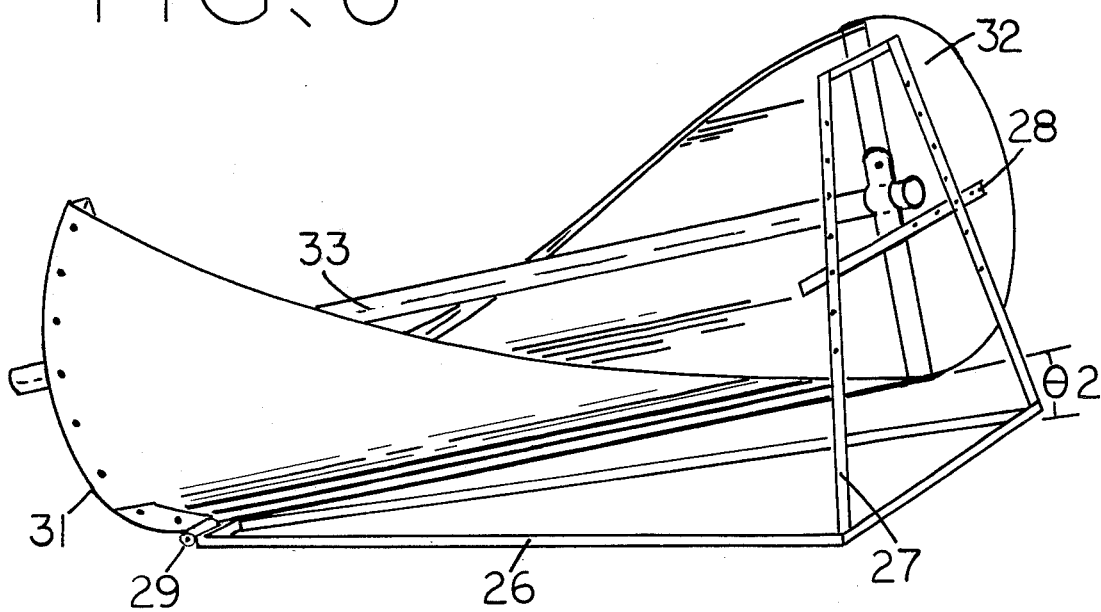
FIG. 6 is a perspective illustration of a typical adjustable mounting for the device.

The tilting and mounting apparatus to accommodate seasonal changes in incidence of sunlight is perspectively shown in FIG. 6 as an example of one possible configuration. Base frame 26 is composed of a steel or aluminum pipe or welded angle iron and can be mounted on many existing or being built structures as desired, such as a roof. Upright 27 is a trapezoid welded or bolted to base frame 26, the dimensions chosen to provide adequate seasonal tilt. Moveable member 28 attached to central core 33 and end 32, wherein the use of bolts, adjustable clamps or other means riding on upright 27 allows the angle $\theta$ 2 to be altered seasonally to accommodate the most advantageous solar elevation. The reflector is pivoted at 29 by a hinge or other pivotal means attached to base plate 26 and lower reflector end 31.

Figure 7:
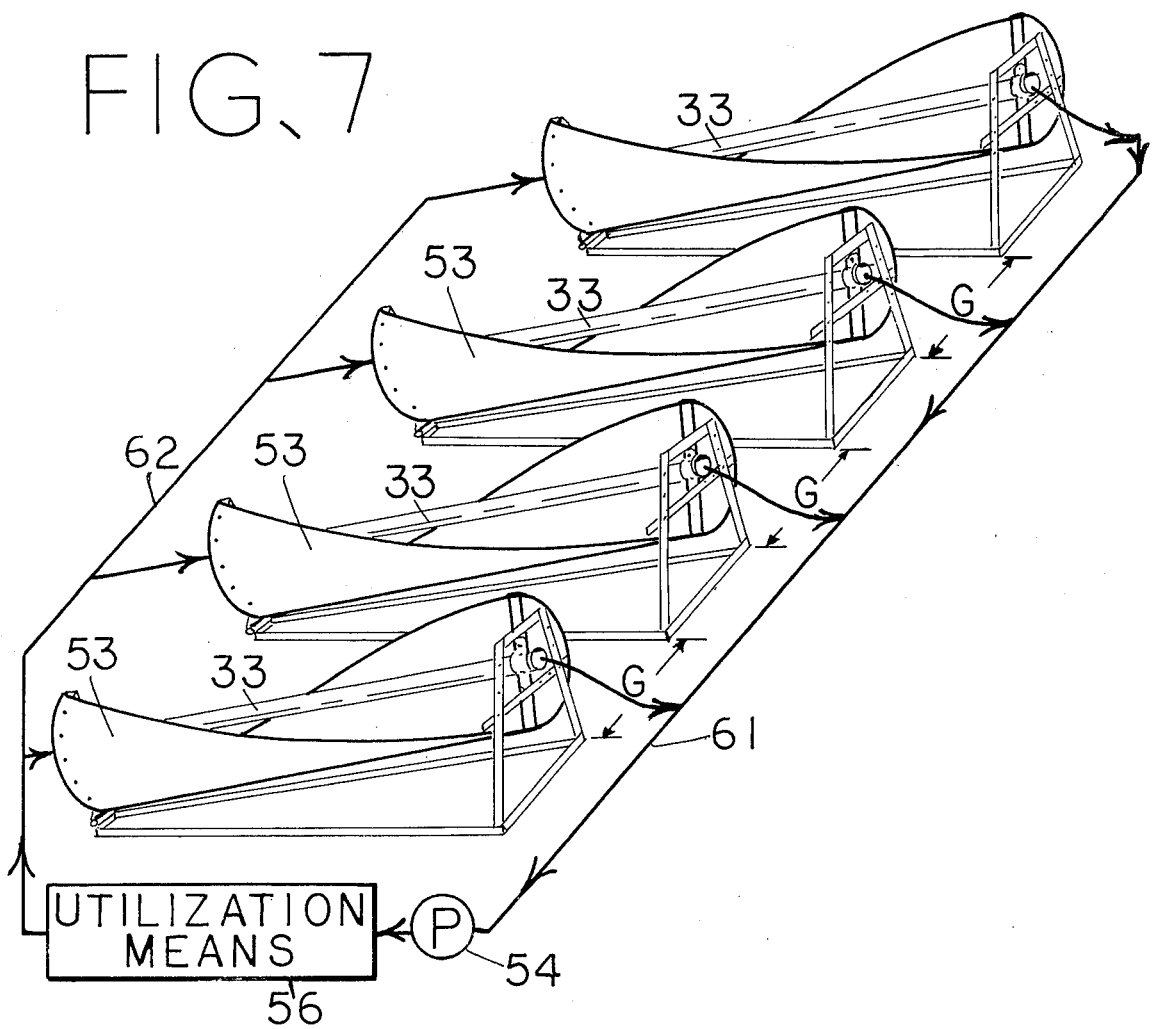
FIG. 7 shows a typical array of helix concentrators utilizing the invention.

FIG. 7 illustrates a concentrator array 53 using a plurality of single concentrators spaced apart so as to minimize the shadow of one concentrator falling on another which would thus restrict the efficiency of the reflector. Spacing G accomplishes this end. In the present instance copper absorption tubing painted black 33 is used as the collector with headers 61 and 62 attached to the collector core 33 in parallel providing inlet and outlet capacity to the pump 54 which in turn passes its output to the utilization means 56. In this instance water is the commonly accepted medium of transfer. The utilization means 56 can take the form of a water heater or exchanger for household or swimming pool use or as a steam generator or other commonly known and accepted form of solar energy utilization or exchange medium. A photovoltaic cell could also be substituted for the copper absorption tubing 33. In this instance electrical wiring and a generator would be substituted for the plumbing 61 and 62 and pump 54 respectively with the addition of a storage system such as batteries connected to the output of a DC generator.

The particular embodiments of the invention herein disclosed have the distinct advantage over previous art in that a highly efficient solar energy concentrator that needs little maintence, is passive in its tracking ability, and is easy and inexpensive to fabricate, has herein been illustrated and described. No attempt to limit the invention to the aforementioned embodiments has been made, modifications and changes may be made thereto if kept within the scope of the claims as listed.

The embodiments of the invention in which an exclusive property or privilege is claimed are defined as follows:

1. A cylindrical radiant solar energy concentrator system comprising an elongated reflector/collector core, said reflector having a semi-tubular concave shape formed in a helix having a reflective surface with up to 360 degrees of turns in its length, said turns producing a contiguous concave helix concentrating reflector, said concave helix reflector caped by two half circle end pieces respectively, said reflective surface oriented to accept solar radiant energy, said radiant energy reflected from said reflective surface so as to focus on said collector core element, said collector core element containing a heat transfer medium, said collector core element being disposed within the sharp focal point of focus of said reflector to absorb said solar energy, said heat transfer medium absorbing energy directed thereto by said reflective surface and heating said transfer medium for use.

2. A device according to claim 1 wherein said concave helix reflector/collector concentrator passively without the use of opto-electro-mechanical tracking devices presents up to a 179 degree aperture of acceptance of solar energy.

3. A device according to claim 1 wherein said reflector is formed in a concave helix and is attached to two half circle end pieces further attached to said collector core element and in so forming and attaching is made to be self supporting.

4. A device according to claim 3 wherein the edges of said reflector are given additional support and stiffening by crimping rods running the full length of said reflector edges.

5. A device according to claim 1 wherein a reflective film with protective overlay is bonded to an insulating layer and constitutes a replaceable reflective surface of said concave helix being attached thereupon and conforms to said concave helix shape.

6. A device according to claim 1 wherein said concave helix reflector and collector core are adjustably tilted to take advantage of seasonal changes in the sun's elevation.

* * * * *